Nov. 10, 1964
J. H. STANLEY
3,156,284
HYDRAULIC FERRULE PRESETTING TOOL
Filed June 29, 1962
3 Sheets-Sheet 1
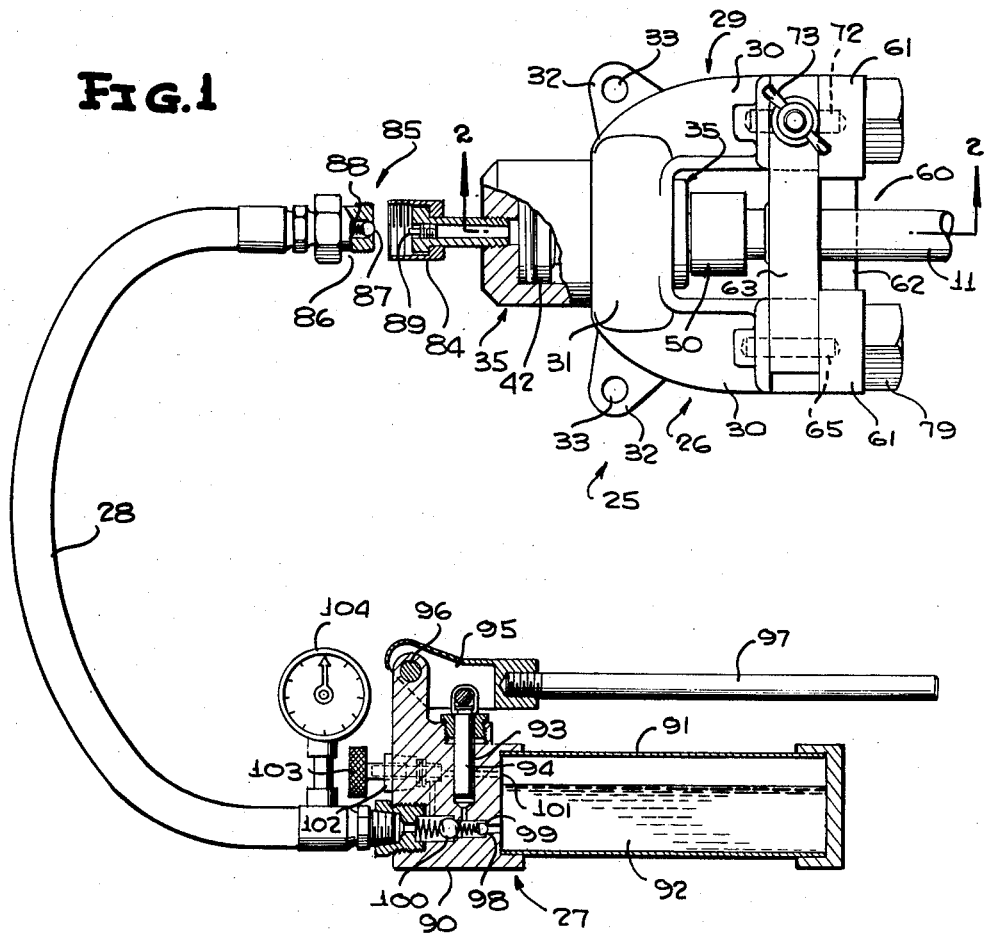
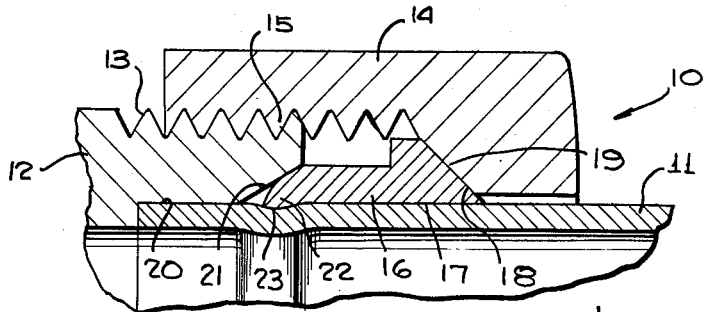
INVENTOR
JOHN H. STANLEY
BY
Mason, Porter, Diller & Stewart
ATTORNEYS Nov. 10, 1964    J. H. STANLEY    3,156,284
HYDRAULIC FERRULE PRESETTING TOOL
Filed June 29, 1962    3 Sheets-Sheet 2

INVENTOR
JOHN H. STANLEY
BY Mason, Porter, Diller & Stewart
ATTORNEYS

Nov. 10, 1964   J. H. STANLEY   3,156,284
HYDRAULIC FERRULE PRESETTING TOOL
Filed June 29, 1962   3 Sheets-Sheet 3
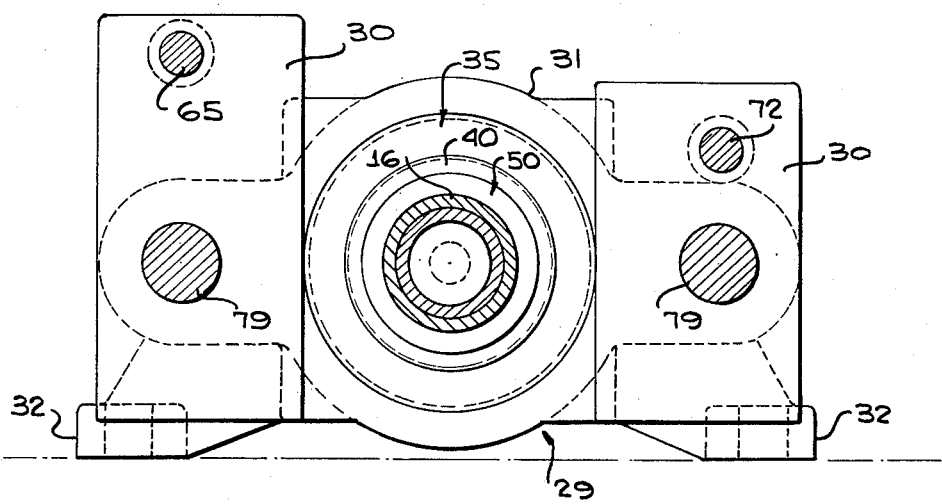
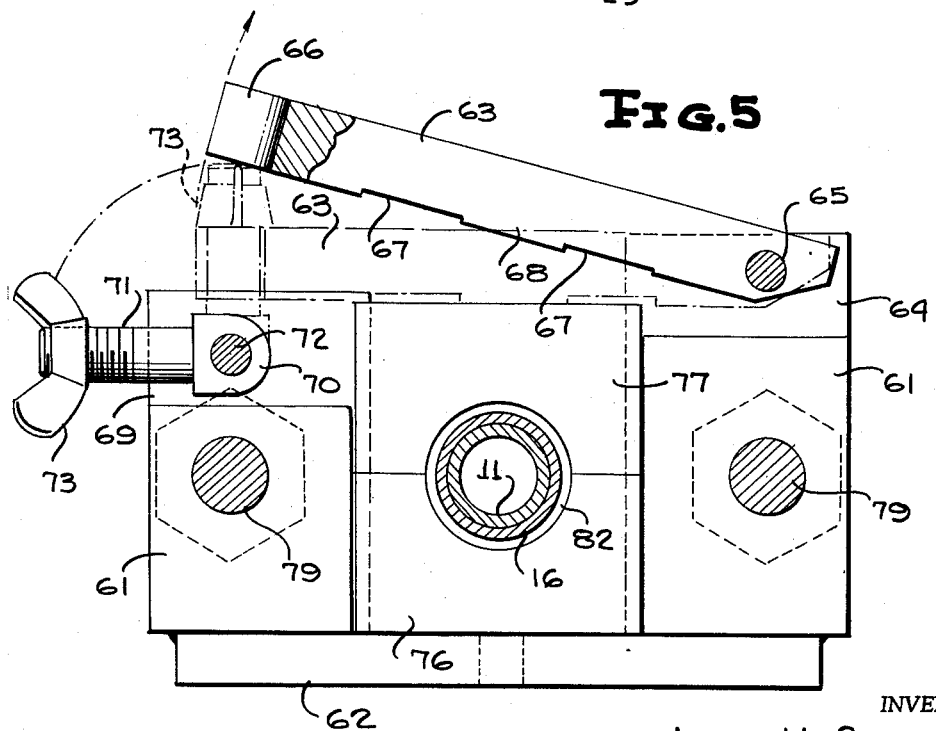
INVENTOR
JOHN H. STANLEY United States Patent Office 3,156,284
Patented Nov. 10, 1964

3,156,284
HYDRAULIC FERRULE PRESETTING TOOL
John H. Stanley, Euclid, Ohio, assignor to Parker-Hannifin Corporation, Cleveland, Ohio, a corporation of Ohio
Filed June 29, 1962, Ser. No. 206,502
7 Claims. (Cl. 153—1)

This invention relates in general to new and useful improvements in ferrule setting tools, and more particularly to a ferrule setting tool which is hydraulically operated whereby a ferrule may be set on a tube under controlled conditions.

This invention specifically relates to a setting of a ferrule wherein in the positioning and securing of a ferrule on a tube, an end portion of the ferrule is deformed so as to form a recess in an associated tube and to seat the inwardly swaged portion of the ferrule in such recess. In the past tools have been made to accomplish this purpose. However, it will be readily apparent that if the ferrule is not seated within the tube with sufficient pressure, the necessary interlock between the ferrule and the tube will not be obtained. On the other hand, if an excessive pressure is utilized in setting the ferrule, then the tube will be unduly deformed and weakened too greatly.

In view of the foregoing, it is the primary object of this invention to provide a hydraulically operated ferrule securing tool which is of a construction wherein the pressure of application of the ferrule to a tube can be controlled by the operator of the tool to thereby assure the proper seating of the ferrule with respect to the tube without the use of undue pressure.

Another object of this invention is to utilize a hydraulic actuator in conjunction with a ferrule securing tool, which actuator includes a manually operated pump and a cylinder, the cylinder being connected to the pump by means of a flexible hydraulic line wherein the pump may be readily manipulated to effect the desired actuation of the cylinder as required in the use of the tool.

Another object of this invention is to provide a readily portable ferrule securing tool which is hydraulically operated, the ferrule securing tool including the customary mandrel for engaging and swaging a ferrule, and the mandrel being connected to a piston of a hydraulic cylinder for movement therewith, the hydraulic cylinder having associated therewith a light weight readily portable manually actuated pump whereby through the actuation of the pump, the mandrel of the ferrule setting or securing tool may be advanced as required to set the ferrule with respect to the associated tube.

Another object of this invention is to provide a novel ferrule setting tool which is hydraulically actuated and wherein the pressure imparted to the mandrel for the setting of the ferrule may be varied in accordance with a particular size of ferrule to be set, and the pressure may be readily determined by means of suitable gauge means so that the operator of the ferrule setting tool may accurately apply pressure as required for the particular ferrule being set.

Another object of this invention is to provide a novel ferrule securing or setting tool which is readily adaptable to numerous sizes of tubes and the associated ferrules, and the tool is constructed to provide the necessary pressure for each ferrule being set, whereby ferrules may be secured to a large range of diameter of tubes utilizing the single ferrule setting tool.

A further object of this invention is to provide a novel hydraulic unit for use with a ferrule setting tool, the hydraulic unit including a cylinder which is removably carried by a frame of a ferrule setting tool, the cylinder having a piston which receives replaceable mandrels, there being connected to the cylinder a flexible hydraulic line which, in turn, is connected to a portable hydraulic pump having a reservoir incorporated therein.

Yet another object of this invention is to provide a replaceable die-block unit for a ferrule setting tool, the die-block unit being for a particular size of tube and ferrule and being readily mountable on a frame of a ferrule setting tool whereby the die-block unit may be readily replaced on the ferrule setting tool so that a single ferrule setting tool, provided with a plurality of die-block units, may accommodate tubes and ferrules of different sizes.

A still further object of this invention is to provide a novel die-block unit for a ferrule setting tool wherein the die-block unit includes a pair of spaced apart die-block retainers which are connected together at the lower ends thereof by a rigid strap and which carry at the upper ends thereof a releasable die-block hold-down, the die-block unit also including a two-piece die-block of which a lower half may be permanently secured in place and the upper half is removable, the upper half of the die-block being releasably retained in position by the die-block retainers and the hold-down.

With the above, and other objects in view that will hereinafter appear, the nature of the invention will be more clearly understood by reference to the following detailed description, the appended claims and the several views illustrated in the accompanying drawings.

In the drawings:

FIGURE 1 is a partly schematic view of the ferrule setting tool of this invention and shows the tube and ferrule engaging components thereof in plan with a portion of the cylinder being broken away, and the pump in elevation with portions of the pump also being broken away and shown in section, the hydraulic line between the pump and the cylinder being temporary disconnected.

FIGURE 4 is an enlarged transverse vertical sectional view taken along the line 4—4 of FIGURE 2 and shows specifically the details of the frame of the tool and the general mounting of the cylinder therein.

FIGURE 5 is an enlarged transverse vertical sectional view taken along the line 5—5 of FIGURE 2 and shows specifically the details of the die-block unit.

FIGURE 6 is an enlarged fragmentary sectional view taken through a tube connection and shows the manner in which a ferrule is upset to be secured to a tube.

Figure 2:
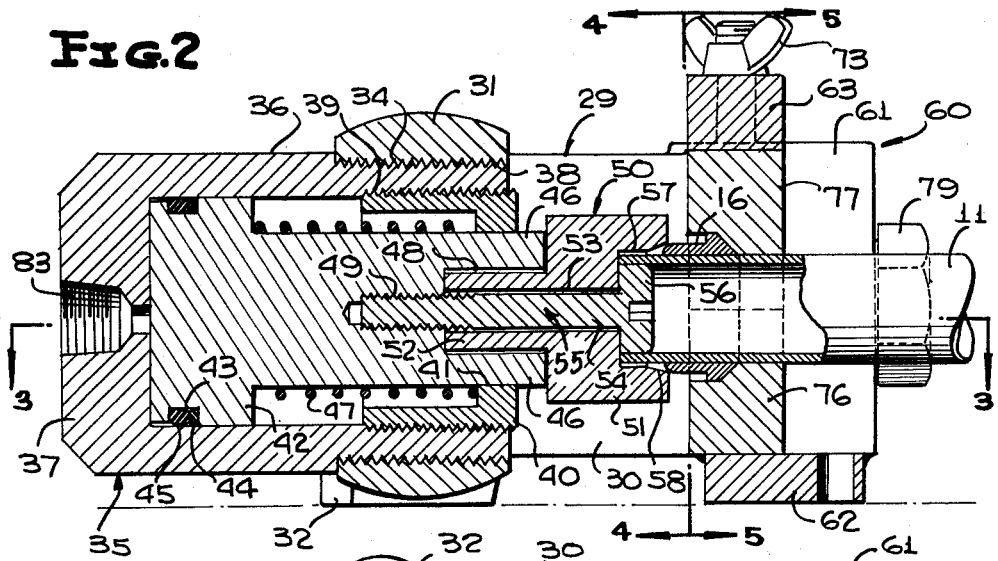
FIGURE 2 is an enlarged longitudinal vertical sectional view taken along the line 2—2 of FIGURE 1 and shows more specifically the details of the tube and ferrule engaging components of the tool.

Referring now to the drawings in detail, reference is first made to FIGURE 6 wherein the details of the tube connection are shown, the tube connection being generally referred to by the numeral 10. The tube connection 10 includes a tube 11 which is secured to a fitting 12 having external threads 13. This is accomplished by means of a nut 14 having internal threads 15 which cooperate with the threads 13. The nut 14, in turn, clampingly engages a ferrule 16 and brings the ferrule 16 to bear against the fitting 12. The ferrule 16 has a bore 17 therethrough of a size to snugly engage the exterior surface of the tube 11. The right hand end of the ferrule 16 includes a generally conical seat 18 which bears against a similarly shaped seat 19 of the nut 14 to form a seal therewith. In addition, the fitting 12 has a bore 20 for snugly receiving an end of the tube 11 and a conical seat 21 for engaging the left end of the ferrule 16 in sealed relation.

It is to be noted that the left end of the ferrule 16 is inwardly deformed, as at 22 and is seated in an annular recess 23 in the exterior surface of the tube 11. Initially the ferrule 16 is generally cylindrical and is upset, as at 22, so as to be deformed inwardly and to simultaneously form the annular groove or recess 23 of the tube 11. In this manner the ferrule 16 is secured to the tube 11 in a fixed position and the position of the ferrule 16 relative to the end of the tube 11 is predetermined.

Reference is now made to FIGURE 1 in particular wherein there is illustrated the ferrule securing or setting tool, which is the subject of this invention, the tool being generally referred to by the numeral 25. The tool 25 includes basically a ferrule setting unit, generally referred to by the numeral 26, a hydraulic pump unit, generally referred to by the numeral 27, a hydraulic line 28 connecting the hydraulic pump unit 27 to the ferrule setting tool unit 26.

The ferrule setting tool unit 26 includes basically a generally U-shaped frame, generally referred to by the numeral 29, which includes a pair of legs 30 connected together by a transverse bight portion 31. The bight portion 31 is provided at the intersection thereof with the legs 30 with a pair of ears 32 having openings 33 therein for releasably securing the unit 26 to a suitable base.

Figure 3:
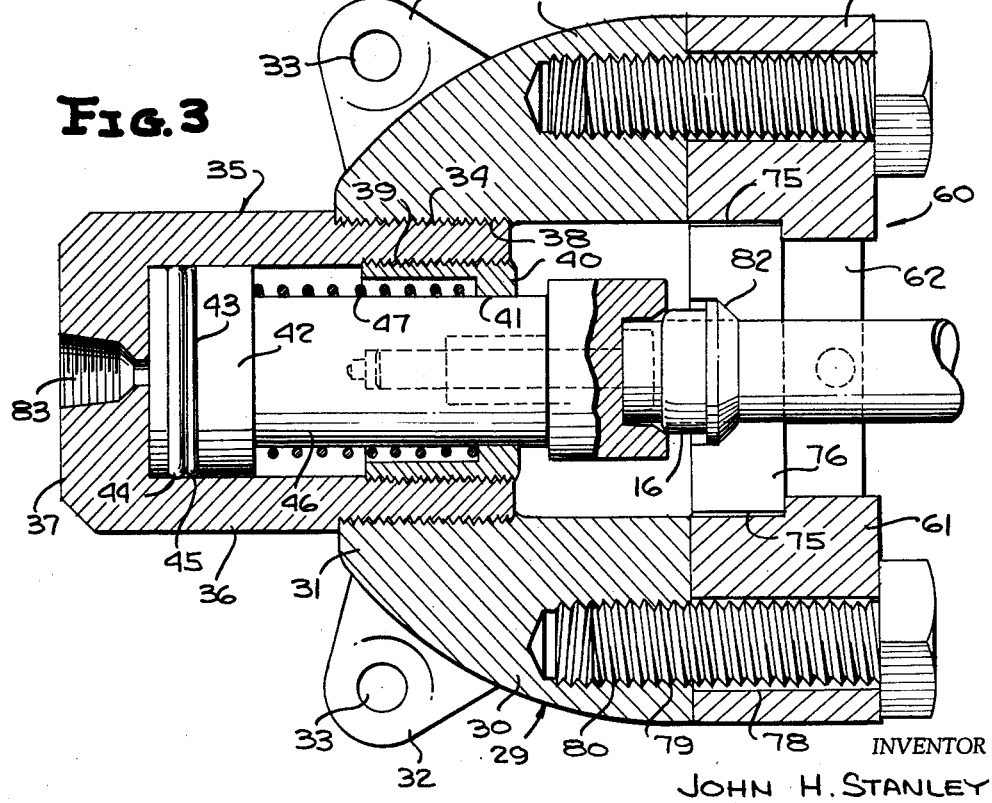
FIGURE 3 is an enlarged horizontal sectional view taken along the line 3—3 of FIGURE 2 and shows further the details of the components of the tool for engaging the tube and ferrule.

Referring now to FIGURES 2 and 3 in particular, it will be seen that the bight portion 31 of the frame 29 is provided with an internally threaded bore 34 which is centrally located and which is aligned generally with the longitudinal axis of the frame 29. One end of a hydraulic cylinder, generally referred to by the numeral 35, is threadedly engaged in the bore 34. The hydraulic cylinder 35 includes a cylindrical portion 36 which is provided with an integral left end 37. The right end of the cylindrical portion 36 is provided with external threads 38 which mate with the threads 34, and with internal threads 39 which are engaged by threads of a plug 40 disposed in the right end of the cylindrical portion 36. The plug 40 is seated substantially entirely within the cylindrical portion 36 and has a bore 41 therethrough.

The hydraulic cylinder 35 also includes a piston 42 having an annular groove 43 therein in which there is seated an O-ring 44 and a backing ring 45. The piston 42 has integrally connected thereto an elongated piston stem 46 which passes through the bore 41 in the plug 40. A spring 47 surrounds the piston stem 46 and has the opposite ends thereof in engagement with the plug 40 and the piston 42 to constantly urge the piston 42 to the left.

As is best shown in FIGURE 2, the piston stem 46 has a bore 48 in the right end thereof. An internally threaded bore 49 extends inwardly into the piston stem 46 from the inner end of the bore 48.

A removable and replaceable mandrel, generally referred to by the numeral 50, is carried by the piston stem 46. The mandrel 50 includes an enlarged head 51 and a stem 52. The stem 52 is of a size to be received within the bore 48 with an appreciable radial clearance therewith to permit self aligning movement of the mandrel 50 with ferrule 16. A bore 53 extends entirely through the mandrel 50 along the center line thereof and a shank 54 of a bolt, generally referred to by the numeral 55, passes through the bore 53 and is threaded into the threaded bore 49. The bolt 55 has a rounded head 56 of a size to be snugly received within a tube on which a ferrule is to be mounted and to accurately position the tube, such as the tube 11 with respect to the mandrel 50.

At this time it is to be pointed out that the mandrel 50 has a recess 57 in the right end thereof. The recess 57 has an outer camming surface 58 for engaging and setting a ferrule, such as the ferrule 16. It is also to be noted that the recess 57 has sufficient clearance with respect to the tube 11 so that the tube 11 may be readily removed from the mandrel 50 in a manner to be described hereinafter.

The ferrule setting unit 26 also includes a replaceable die-block unit, generally referred to by the numeral 60. The replaceable die-block unit 60 includes a pair of die-block retainers 61 which are disposed in transversely spaced relation and which are rigidly connected together by a lower strap 62 which is securely welded or otherwise secured thereto. The upper ends of the die-block retainers 61 carry a die-block hold-down 63 which is best illustrated in FIGURE 5. The hold-down 63, as viewed in FIGURE 5, has a right end which is seated in a recess 64 in the associated die-block retainer 61 and which is pivoted therein on a pivot pin 65. The left end of the hold-down 63 is bifurcated, as at 66. Further, the underneath surface of the hold-down 63 is recessed, as at 67, to define a depending die-block engaging portion 68 which is disposed centrally of the axis of the ferrule setting unit 26.

The die-block retainer 61 which is remote from that carrying the pivot pin 65 has a recess 69 in which there is received an enlarged end 70 of a clamp bolt 71. The enlarged end 70 is pivotally mounted on a pivot pin 72 carried by the associated die-block retainer 61. The clamp bolt 71 is provided with a wing nut 73. The clamp bolt 71 is adapted to be received in the bifurcated end 66 of the hold-down 63 and the wing nut 73 engages the upper surface of the hold-down 63, as shown in phantom lines in FIGURE 5, to retain the hold-down 63 in a die-block clamping position.

Referring once again to FIGURE 3 in particular, it will be seen that the opposed surfaces of the die-block retainer 61 are slightly recessed, as at 75 to center the die-blocks therebetween. Each die block is formed of a lower die-block half 76 and an upper die-block half 77. The lower die-block half 76 may be, but not necessarily, rigidly secured to the strap 62 and the die-block retainer 61, such as by welding. On the other hand, the upper die-block half 77 must be free for removal upwardly between the die-block retainer 61.

Each die-block retainer 61 has a bore 78 therethrough through which passes a bolt 79. Each bolt 79 is threaded into a threaded bore 80 in the right end of the associated leg 30 and the bolt 79 serves to clamp the die-block unit 60 against the frame 29.

At this time reference is made to FIGURE 4 wherein it will be seen that one of the legs 30 has a greater height than the other. This is necessitated by the fact that the pivot pin 65 is disposed at a greater elevation than the pivot pin 72. In view of the fact that the recesses 64 and 69 formed in the die-block retainer 61 are formed in the faces of the die-block retainers which oppose the frame 29, and in order to provide supports at opposite ends of the pivot pin 65 or 67, the legs 30 are provided with suitable bores aligned with the bores in the die-block retainer 61 receiving the pivot pins 65 and 72. At the same time, it is pointed out that the two die-block retainers 61 and 62 are also of different heights, the heights of the die-block retainer 61 corresponding to the heights of the legs 30.

It is to be noted from FIGURES 2 and 3, that the die block heads 76 and 77 combine to define a seat 82 in which the ferrule 16 is seated during the setting thereof.

The end wall 37 of the cylinder 35 is provided with a threaded bore 83 in which there is threaded but one-half 84 of a detachable hydraulic line coupling, generally referred to by the numeral 85. The hydraulic line coupling 85 includes a second half 86 which is carried by the hydraulic line 28. It is to be noted that the hydraulic line coupling 84 is of the type which prevents loss of hydraulic fluid from the hydraulic line 28 when the coupling 85 is broken. To this end, the coupling half 86 is provided with a ball check valve 87 which is spring loaded by means of a spring 88 and which is unseated by a pin 89 when the two halves 84 and 86 are threaded together.

The hydraulic pump unit 27 includes a frame 90 to which there is suitably secured a tube 91 which defines a reservoir for a supply of hydraulic fluid 92. The frame 90 has formed therein a cylinder 93 which receives a pump piston 94. The pump piston 94 has the upper end thereof connected to an actuator 95 which is pivotally mounted on the frame 90 by means of a pivot pin 96 and to which there is connected a handle 97 for the manual actuation of the piston 94. The frame 90 is provided with suitable hydraulic fluid passages 98 and valves 99 and 100 as is required in the normal actuation of a pump for pumping hydraulic fluid from the reservoir 91 through the hydraulic line 28 by means of the piston 94. It is to be noted that the construction of the pump unit 27 is such that hydraulic fluid can be pumped only from the pump unit through the hydraulic line 28 and into the cylinder 35. When the ferrule setting operation is completed, the spring 47 will urge the piston 42 to the left and urge the hydraulic fluid back into the reservoir 91. The valves 99 and 100 normally prevent this. However, suitable by-pass passages 101 are formed in the frame 90 and controlled by a valve 102 to permit the return flow of hydraulic fluid into the reservoir 91. The valve 102 has a knurled knob 103 for the opening and closing thereof.

The hydraulic system of the ferrule securing tool 25 is also provided with a pressure gauge 104 for permitting an accurate determination of the pressure being applied by the mandrel 50 on the ferrule being set. It is to be understood that depending upon the diameter of the tube and its associated ferrule, the pressure required to set the ferrule will vary.

*Operation*

In the use of the ferrule setting tool 25, the frame 29 is first provided with the proper die-block unit 60 for the tube and ferrule to be assembled. Once this has been accomplished, the assembled tube and ferrule have been seated within the mandrel 50 and the die-block halves 76 and 77, as is shown in FIGURES 2 and 3, the hydraulic pump unit 27 is manually actuated so as to supply hydraulic fluid under pressure to cylinder 35 at the left of the piston 42. This moves the piston 42 and the mandrel 50 carried thereby to the right. As the mandrel 50 moves to the right, the tube 11 moves with the mandrel and the camming surface 58 of the mandrel 50 engages the left end of the ferrule 16 to set the ferrule 16 on the tube 11 at the proper distance from the end of the tube 11 in the manner shown in FIGURE 6. The hold-down 63 is now released and the upper die-block half 77 is removed. The tube 11 may be tilted upwardly due to the clearance provided in the end of the mandrel 50 and the assembled tube and ferrule removed. Since the pressure involved in the ferrule setting operation is controlled, there is no danger of damage to the tube and proper setting of the ferrule is assured.

Although a preferred embodiment of the ferrule setting tool has been illustrated and described, it is to be understood that minor modifications may be made therein within the spirit and scope of this invention, as defined by the appended claims.

What is claimed as new:

1. A ferrule securing tool for securing ferrules on tubes, said tool comprising a housing, a die-block carried by said housing for holding a tube, said die-block having a ferrule positioning seat, said housing including a cylinder having an axis disposed coextensive with the tube axis of said die-block, a piston mounted within said cylinder for movement towards and away from said die-block, a die member carried by said piston for movement therewith, said die member having an end facing said die-block with said end having a recess therein for receiving an end portion of a tube, said recess having an outer wall portion defining a camming surface for engaging and inwardly indenting an end of a ferrule remote from said die-block to force the ferrule end into the surface of an associated tube to form an interlock therewith, and a hydraulic pump connected to said cylinder for driving said die member towards said die block.

2. The ferrule securing tool of claim 1 wherein said hydraulic pump is disposed remote from said cylinder and is connected thereto by a flexible hydraulic line.

3. The ferrule securing tool of claim 1 wherein means replaceably secures said die member to said piston and means carried by said housing releasably and replaceably secures said die-block in said housing, whereby said ferrule securing tool may accommodate tubes and ferrules of different sizes.

4. The ferrule securing tool of claim 1 together with a hydraulic pressure gauge whereby the ferrule seating force applied by said tool may be readily controlled.

5. The ferrule securing tool of claim 1 wherein said housing includes a replaceable die-block holder whereby die-blocks of different sizes may be mounted in said housing, each die-block holder includes a releaseable die block hold-down, and each die-block is formed of two halves to facilitate the removal of a ferrule and tube assembly.

6. The ferrule securing tool of claim 1 wherein said housing has a socket, and said cylinder is removably threaded in said socket.

7. The ferrule securing tool of claim 1 wherein said cylinder has a return spring for said piston.

References Cited in the file of this patent

UNITED STATES PATENTS

| 2,182,663 | Eby et al. | Dec. 5, 1939 |
| 3,048,212 | Morrison | Aug. 7, 1962 |

FOREIGN PATENTS

| 806,525 | Great Britain | Dec. 31, 1958 |